(12) United States Patent
Ravindranath et al.

(10) Patent No.: US 9,026,812 B2
(45) Date of Patent: May 5, 2015

(54) SYSTEM AND METHOD FOR PROVIDING INTELLIGENT POWER MANAGEMENT IN A NETWORK ENVIRONMENT

(75) Inventors: Ram Mohan Ravindranath, Bangalore (IN); Prasad Babu Girirajan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 12/826,416

(22) Filed: Jun. 29, 2010

(65) Prior Publication Data

US 2011/0320833 A1    Dec. 29, 2011

(51) Int. Cl.
*H04L 12/10* (2006.01)
*H04L 12/12* (2006.01)

(52) U.S. Cl.
CPC ............... *H04L 12/12* (2013.01); *H04L 12/10* (2013.01); *Y02B 60/34* (2013.01)

(58) Field of Classification Search
CPC ................................ Y02B 60/50; G06F 1/26
USPC .................... 713/300, 323, 310, 320
See application file for complete search history.

(56) References Cited

U.S. PATENT DOCUMENTS

| | | |
|---|---|---|
| 4,785,927 A | 11/1988 | Dobbins |
| 6,269,343 B1 | 7/2001 | Pallakoff |
| 6,415,270 B1 | 7/2002 | Rackson et al. |
| 6,618,709 B1 | 9/2003 | Sneeringer |
| 6,681,156 B1 | 1/2004 | Weiss |
| 6,686,709 B2 | 2/2004 | Lee et al. |
| 6,785,592 B1 | 8/2004 | Smith et al. |
| 6,930,947 B2 | 8/2005 | Chen |
| 6,980,526 B2 | 12/2005 | Jang et al. |
| 7,084,752 B2 | 8/2006 | Parello et al. |
| 7,177,728 B2 | 2/2007 | Gardner |
| 7,188,260 B1 | 3/2007 | Shaffer et al. |
| 7,203,849 B2 | 4/2007 | Dove |
| 7,263,450 B2 | 8/2007 | Hunter |
| 7,324,518 B2 | 1/2008 | Dai et al. |

(Continued)

FOREIGN PATENT DOCUMENTS

WO    WO2013/025267    2/2013

OTHER PUBLICATIONS

"Wake on Local Area Network (LAN)," EnergyStar Products, Energy Star; [printed on Nov. 16, 2011]; 4 pages; http://www.energystar.gov/index.cfm?c=power_mgt.pr_power_mgt_wol.

(Continued)

*Primary Examiner* — Jaweed A Abbaszadeh
*Assistant Examiner* — Alyaa T Mazyad
(74) *Attorney, Agent, or Firm* — Patent Capital Group

(57) ABSTRACT

An example method is provided and includes communicating a first packet to a network element in order to indicate whether an endpoint can have its power managed by network communications. The first packet includes an Internet protocol (IP) address associated with the endpoint. The method also includes receiving a second packet from the network element to identify whether the endpoint can have its power managed. The endpoint is configured to have its power managed via a port associated with the endpoint. In more specific embodiments, a state associated with the endpoint is used to determine whether to power on, or to power off the endpoint. In other implementations, the endpoint is powered on, or powered off at a specific time based on a policy associated with the endpoint.

20 Claims, 13 Drawing Sheets

(56) References Cited

U.S. PATENT DOCUMENTS

| | | | |
|---|---|---|---|
| 7,337,336 B2 | 2/2008 | Ferentz et al. | |
| 7,366,933 B1 | 4/2008 | Aharonian et al. | |
| 7,392,407 B2 | 6/2008 | Jonnala et al. | |
| 7,698,580 B2 | 4/2010 | Schindler et al. | |
| 7,734,572 B2 | 6/2010 | Wiemeyer et al. | |
| 7,908,501 B2 | 3/2011 | Kim et al. | |
| 7,921,306 B2 | 4/2011 | Dove | |
| 7,941,677 B2* | 5/2011 | Penning | 713/300 |
| 7,966,502 B2 | 6/2011 | Diab et al. | |
| 7,974,298 B2* | 7/2011 | Baird et al. | 370/419 |
| 8,352,754 B2 | 1/2013 | Chin | |
| 8,407,332 B1 | 3/2013 | Kralpak et al. | |
| 2002/0016639 A1 | 2/2002 | Smith et al. | |
| 2002/0040475 A1 | 4/2002 | Yap et al. | |
| 2002/0157030 A1 | 10/2002 | Barker et al. | |
| 2003/0052180 A1 | 3/2003 | Huhn et al. | |
| 2003/0120959 A1 | 6/2003 | Bohrer | |
| 2004/0148388 A1* | 7/2004 | Chung et al. | 709/224 |
| 2005/0055589 A1* | 3/2005 | Kojo | 713/300 |
| 2005/0123109 A1 | 6/2005 | Yamagishi et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2006/0072531 A1 | 4/2006 | Ewing et al. | |
| 2007/0014268 A1 | 1/2007 | Kim et al. | |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0135086 A1 | 6/2007 | Stanford | |
| 2007/0143637 A1* | 6/2007 | Tsai | 713/300 |
| 2007/0189257 A1* | 8/2007 | Suzuki et al. | 370/338 |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda | |
| 2008/0052546 A1 | 2/2008 | Schindler et al. | |
| 2008/0063381 A1 | 3/2008 | Conroy et al. | |
| 2008/0168283 A1 | 7/2008 | Penning | |
| 2008/0178232 A1 | 7/2008 | Velusamy | |
| 2008/0215899 A1 | 9/2008 | Jonnala et al. | |
| 2008/0215902 A1 | 9/2008 | Jonnala et al. | |
| 2008/0225841 A1 | 9/2008 | Conway et al. | |
| 2008/0244282 A1 | 10/2008 | Hansalia et al. | |
| 2008/0256371 A1 | 10/2008 | Diab et al. | |
| 2008/0272741 A1 | 11/2008 | Kanamori | |
| 2008/0301322 A1 | 12/2008 | Horibe | |
| 2008/0303486 A1 | 12/2008 | Kao | |
| 2009/0049315 A1 | 2/2009 | Diab et al. | |
| 2009/0070603 A1* | 3/2009 | Diab et al. | 713/300 |
| 2009/0083167 A1 | 3/2009 | Subbloie | |
| 2009/0182834 A1 | 7/2009 | Zettler et al. | |
| 2009/0195349 A1 | 8/2009 | Frader-Thompson | |
| 2009/0196281 A1* | 8/2009 | Kouchri | 370/352 |
| 2009/0217063 A1 | 8/2009 | Tomita | |
| 2009/0217188 A1* | 8/2009 | Alexander et al. | 715/771 |
| 2009/0228723 A1 | 9/2009 | Yoshizaki | |
| 2009/0229288 A1 | 9/2009 | Alston et al. | |
| 2009/0249091 A1 | 10/2009 | Goodnow | |
| 2009/0263127 A1 | 10/2009 | Haran et al. | |
| 2009/0282277 A1 | 11/2009 | Sedarat et al. | |
| 2009/0310607 A1 | 12/2009 | Evans | |
| 2010/0052421 A1 | 3/2010 | Schindler et al. | |
| 2010/0070217 A1 | 3/2010 | Shimada et al. | |
| 2010/0080111 A1 | 4/2010 | Diab et al. | |
| 2010/0111523 A1 | 5/2010 | Hirth et al. | |
| 2010/0145542 A1 | 6/2010 | Chapel et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0205466 A1 | 8/2010 | Diab et al. | |
| 2010/0235868 A1 | 9/2010 | Howarter et al. | |
| 2010/0241880 A1 | 9/2010 | Wertheimer et al. | |
| 2010/0247068 A1 | 9/2010 | Howarter et al. | |
| 2010/0309904 A1* | 12/2010 | Couse | 370/352 |
| 2010/0322078 A1 | 12/2010 | Wang et al. | |
| 2010/0329108 A1 | 12/2010 | Diab et al. | |
| 2011/0022699 A1 | 1/2011 | Powell et al. | |
| 2011/0029796 A1 | 2/2011 | Matthews et al. | |
| 2011/0067048 A1 | 3/2011 | Barton et al. | |
| 2011/0072286 A1* | 3/2011 | Graham | 713/323 |
| 2011/0125337 A1 | 5/2011 | Zavadsky | |
| 2011/0131428 A1 | 6/2011 | Diab et al. | |
| 2011/0131438 A1* | 6/2011 | Levitan | 713/324 |
| 2011/0157939 A1 | 6/2011 | Wang | |
| 2011/0199046 A1 | 8/2011 | Tsai | |
| 2011/0239019 A1 | 9/2011 | Johnston | |
| 2011/0246797 A1 | 10/2011 | Diab et al. | |
| 2012/0045210 A1 | 2/2012 | Kim et al. | |
| 2012/0091804 A1 | 4/2012 | Altonen et al. | |
| 2012/0095610 A1 | 4/2012 | Chapel et al. | |
| 2012/0120958 A1 | 5/2012 | Mahadevan et al. | |
| 2012/0131369 A1 | 5/2012 | Paljug | |
| 2012/0226918 A1 | 9/2012 | Rallo | |
| 2012/0233478 A1 | 9/2012 | Mucignat et al. | |
| 2012/0259474 A1 | 10/2012 | Razum et al. | |
| 2012/0284537 A1 | 11/2012 | Kruglick | |
| 2013/0303202 A1 | 11/2013 | Jafarian et al. | |

OTHER PUBLICATIONS

Battery University, "How to Prolong Lithium-based Batteries," © 2011 Isidor Buchmann, 15 pages; http://www.batteryuniversity.com/parttwo-34.htm.

Claise, Benoit, et al., "Energy Management (eman): Description of Working Group," retrieved and printed on Aug. 17, 2011, 3 pages http://datatracker.ietf.org/wg/eman/charter/.

U.S. Appl. No. 12/368,124, filed Feb. 9, 2009, entitled "System and Method for Intelligent Energy Management in a Network Environment," Inventor(s): Tirthankar Ghose et al.

U.S. Appl. No. 12/368,154, filed Feb. 9, 2009, entitled "System and Method for Querying for Energy Data in a Network Environment," Inventor(s): Tirthankar Ghose et al.

U.S. Appl. No. 13/211,798, filed Aug. 17, 2011, entitled "System and Method for Notifying and for Controlling Power Demand," Inventors: Benoit Claise, et al.

U.S. Appl. No. 13/302,544, filed Nov. 22, 2011, entitled "System and Method for Network Enabled Wake for Networks," Inventors: Charles B. Schoening, et al.

U.S. Appl. No. 13/226,326, filed Sep. 6, 2011, entitled "Power Conservation in a Distributed Digital Video Recorder/Content Delivery Network System," Inventor: William VerSteeg.

U.S. Appl. No. 13/492,617, filed Jun. 8, 2012, entitled "System and Method for Detecting a Power Source and Metering Points of a Network Device in a Network Environment," Inventor: John D. Parello, et al.

USPTO Jun. 23, 2011 Nonfinal Office Action from U.S. Appl. No. 12/368,124.

USPTO Sep. 23, 2011 Response to Jun. 23, 2011 Nonfinal Office Action filed in U.S. Appl. No. 12/368,124.

USPTO Nov. 10, 2011 Final Office Action from U.S. Appl. No. 12/368,124.

USPTO Feb. 7, 2012 RCE Response to Final Office Action mailed Nov. 10, 2011 from U.S. Appl. No. 12/368,124.

USPTO Jun. 28, 2011 Nonfinal Office Action from U.S. Appl. No. 12/368,154.

USPTO Oct. 11, 2011—Response to Jun. 28, 2011 Nonfinal Office Action from U.S. Appl. No. 12/368,154.

USPTO Nov. 18, 2011—Final Office Action from U.S. Appl. No. 12/368,154.

USPTO Feb. 16, 2012 RCE Response to Final Office Action mailed Nov. 18, 2011 from U.S. Appl. No. 12/368,154.

USPTO Mar. 28, 2012 Notice of Allowance from U.S. Appl. No. 12/368,154.

USPTO Jun. 22, 2012 Request for Continued Examination from U.S. Appl. No. 12/368,154.

USPTO Jul. 17, 2012 Second Notice of Allowance from U.S. Appl. No. 12/368,154.

USPTO May 24, 2012 Non Final Office Action from U.S. Appl. No. 12/700,175.

(56) References Cited

OTHER PUBLICATIONS

USPTO Aug. 22, 2012 Non-Final Office Action from U.S. Appl. No. 12/368,124.
USPTO Nov. 21, 2012 Response to Aug. 22, 2012 Non-Final Office Action from U.S. Appl. No. 12/368,124.
USPTO Jan. 16, 2013 Final Office Action from U.S. Appl. No. 12/368,124.
USPTO Oct. 12, 2012 Request for Continued Examination from U.S. Appl. No. 12/368,154.
USPTO Oct. 26, 2012 Third Notice of Allowance from U.S. Appl. No. 12/368,154.
USPTO Aug. 7, 2012 Response to May 24, 2012 Non Final Office Action from U.S. Appl. No. 12/700,175.
USPTO Oct. 5, 2012 Final Office Action from U.S. Appl. No. 12/700,175.
USPTO Jan. 4, 2013 RCE Response to Oct. 5, 2012 Final Office Action from U.S. Appl. No. 12/700,175.
U.S. Appl. No. 13/736,035, filed Jan. 7, 2013, entitled "System and Method for Querying for Energy Data in a Network Environment," Inventor: Tirthankar Ghose, et al.
PCT Sep. 5, 2012 International Search Report and Written Opinion from International Application Serial No. PCT/US12/37359 10 pages.
USPTO May 3, 2013 Non-Final Office Action from U.S. Appl. No. 12/368,124.
USPTO Jul. 5, 2013 Non-Final Office Action from U.S. Appl. No. 13/302,544.
Jetzt, et al., LLDP/LLDP-MED Proposal for PoE Plus,; PoE Plus Task Force, Sep. 15, 2006, Knoxville, TN; 15 pages.
USPTO Aug. 2, 2013 Response to May 3, 2013 Non-Final Office Action from U.S. Appl. No. 12/368,124.
USPTO Sep. 11, 2013 Final Office Action from U.S. Appl. No. 12/368,124.
USPTO Sep. 18, 2013 Non-Final Office Action from U.S. Appl. No. 13/736,035.
USPTO Oct. 8, 2013 Response to Jul. 5, 2013 Non-Final Office Action from U.S. Appl. No. 13/302,544.
USPTO Oct. 25, 2013 Final Office Action from U.S. Appl. No. 13/302,544.
Wertheimer, et al., "Capabilities Negotiation Proposal for Energy-Efficient Ethernet," IEEE 802.3az, May 2008, pp. 1-18.
PCT Feb. 18, 2014 International Preliminary Report on Patentability from International Application Serial No. PCT/US12/37359 7 pages.
USPTO Jan. 8, 2014 Notice of Allowance from U.S. Appl. No. 12/368,124.
USPTO Jan. 27, 2014 Notice of Allowance from U.S. Appl. No. 13/736,035.
USPTO Feb. 27, 2014 Non-Final Office Action from U.S. Appl. No. 12/700,175.
USPTO Feb. 6, 2014 Non-Final Office Action from U.S. Appl. No. 13/302,544.
USPTO Jan. 21, 2014 Non-Final Office Action from U.S. Appl. No. 13/226,326.
USPTO Dec. 23, 2014 Non-Final Office Action from U.S. Appl. No. 13/302,544.
"Data Link Layer," Wikipedia, Jun. 28, 2014, 7 pages http://en.wikipedia.org/wiki/Data_link_layer.
"Link Layer Discovery Protocol," Wikipedia, Mar. 28, 2014, 4 pages http://en.wikipedia.org/wiki/Link_Layer_Discovery_Protocol.
USPTO Jul. 25, 2014 Final Office Action from U.S. Appl. No. 12/700,175.
USPTO Nov. 21, 2014 Notice of Allowance from U.S. Appl. No. 12/700,175.
USPTO Jun. 2, 2014 Notice of Allowance from U.S. Appl. No. 13/211,798.
USPTO May 22, 2014 Non-Final Office Action from U.S. Appl. No. 13/302,544.
USPTO Aug. 28, 2014 Final Office Action from U.S. Appl. No. 13/302,544.
USPTO Aug. 6, 2014 Final Office Action from U.S. Appl. No. 13/226,326.
USPTO Nov. 10, 2014 Non-Final Office Action from U.S. Appl. No. 13/492,617.
Bruce Nordman, "Energy Efficient Ethernet: Outstanding Questions," Mar. 12, 2007; 3 pages http://grouper.ieee.org/groups/802/3/eee_study/public/mar07/nordman2_01_0307.pdf.
Onn Haran, "Applicability of EEE to Fiber PHYs," IEEE 8.02.3 EEE Meeting; Sep. 2007, Seoul, Korea http://www.ieee802.org/3/eee_study/public/sep07/haran_1_0907.pdf; 12 pages.
Mike Bennett, "IEEE 802.3az Energy Efficient Ethernet," Task Force Update, Presented to the P802.3ba Task Force, Denver, CO; Jul. 16, 2008; 17 pages http://www.ieee802.org/3/az/public/jul08/bennett_03_0708.pdf.
USPTO Apr. 16, 2013 RCE Response to Final Office Action dated Jan. 16, 2013 from U.S. Appl. No. 12/368,124.

\* cited by examiner

| TYPE | LENGTH (4 BYTES) | OP-CODE (8 BIT) | INFORMATION (24 BITS) |
|---|---|---|---|

OP-CODE FORMAT (8 BITS)

| SOURCE-0 | SOURCE-1 | RESERVED | RESERVED | RESERVED | BIT-2 | BIT-1 | BIT-0 |
|---|---|---|---|---|---|---|---|

| SOURCE-0 | SOURCE-1 | EXPLANATION. |
|---|---|---|
| 1 | 0 | PoE CONTROLLER (SWITCH ROUTER) |
| 0 | 0 | PoE ENDPOINT |
| 0 | 1 | CALL-AGENT |
| 1 | 1 | RESERVED |

40

BIT-0 AND BIT-1 EXPLANATION

| BIT-2 | BIT-1 | BIT-0 | DETAILS |
|---|---|---|---|
| 0 | 0 | 0 | POWER-OFF ENDPOINT |
| 0 | 0 | 1 | POWER-ON ENDPOINT |
| 0 | 1 | 0 | POWER-OFF WITH TIME RANGE |
| 0 | 1 | 1 | POWER-ON WITH TIME RANGE |
| 1 | 0 | 0 | USED BY ENDPOINT/CALL AGENT TO DECIDE POWERING OFF |
| 1 | 0 | 1 | SENT BY CALL AGENT TO KEEP THE ENDPOINT POWER ON |
| 1 | 1 | 1 | ENDPOINT SENDS INFORMATION ABOUT NETWORK ELEMENT TO CALL AGENT |

SYSTEM AND METHOD FOR PROVIDING INTELLIGENT POWER MANAGEMENT IN A NETWORK ENVIRONMENT

TECHNICAL FIELD

This disclosure relates in general to the field of power management and, more particularly, to providing intelligent power management in a network environment.

BACKGROUND

Energy conservation strategies have grown in complexity in recent years. Consumers and legislators have initiated improvements in energy efficiency. Internet protocols for managing devices were developed when there were relatively few devices connected to the network. Currently, millions of devices are connected to the Internet via energy links (e.g., Ethernet links), and the proliferation of these devices is expected to grow in orders of magnitude. Power states have evolved to the point where they are commonly implemented within most devices (e.g., a low-power sleep state supported by personal computing systems). Energy efficient features have been developed in order to reduce unnecessary energy consumption. Additionally, many power consumption features may ultimately be required of network components, switches, personal end-user devices, and other electronic components. As a general proposition, consuming minimal power, without sacrificing performance, presents a significant challenge to equipment vendors, network operators, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified schematic diagram illustrating details related to example signal formatting associated with the communication system in accordance with one embodiment;

DETAILED DESCRIPTION OF EXAMPLE EMBODIMENTS

Overview

A method is provided in one example embodiment and includes communicating a first packet to a network element in order to indicate whether an endpoint can have its power managed by network communications. The first packet includes an Internet protocol (IP) address associated with the endpoint. The method also includes receiving a second packet from the network element to identify whether the endpoint can have its power managed. The endpoint is configured to have its power managed via a port associated with the endpoint. In more specific embodiments, a state associated with the endpoint is used to determine whether to power on, or to power off the endpoint. In other implementations, the endpoint is powered on, or powered off at a specific time based on a policy associated with the endpoint. Note that there can be cases where the endpoint interacts with a management element (e.g., a call agent) for power management. The state of the endpoint can also be retrieved from the management element, or the endpoint itself may have this information.

In a specific embodiment, the first packet can include a Type Length Value (TLV) format. In certain flows, a command from a call agent is provided to power on the endpoint based on a presence of an incoming call for the endpoint. The first packet can also include an opcode for identifying a state associated with the endpoint. In particular arrangements, the endpoint is an Internet protocol (IP) phone, and the first packet includes interface data and port details associated with the IP phone. Additionally, the endpoint can signal when it should be subsequently powered on, as the endpoint is being powered off.

Example Embodiments

Figure 1:
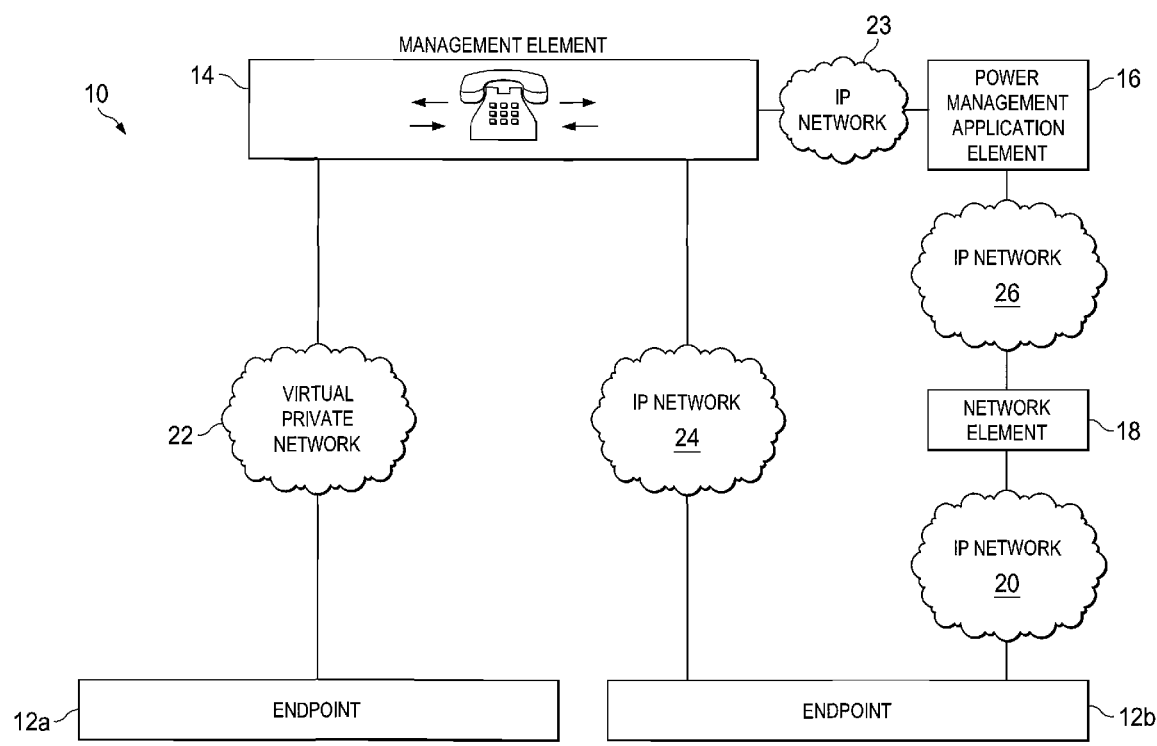
FIG. 1 is a simplified block diagram of a communication system for providing intelligent power management in a network environment in accordance with one embodiment of the present disclosure.

Turning to FIG. 1, FIG. 1 is a simplified block diagram of a communication system 10 for providing intelligent power management in a network environment in accordance with one embodiment of the present disclosure. FIG. 1 includes multiple endpoints 12*a-b*, a manager element 14, a power management application element 16, a network element 18, multiple Internet protocol (IP) networks 20, 23, 24, 26, and a virtual private network (VPN) 22. Communication system 10 can be configured to provide intelligent power management protocols for associated endpoints.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may also readily operate in conjunction with various types of power over Ethernet (PoE) protocols, as discussed below. Details relating to the possible signaling and interactions between the components of communication system 10 are provided below with reference to FIGS. 2-14.

For purposes of illustrating certain example techniques of communication system 10, it is important to understand the energy issues applicable to most electronic devices that are coupled to a network. The following foundational information may be viewed as a basis from which the present disclosure may be properly explained. Energy costs have increased the need for better energy allocations. Methods to measure power consumption and to control energy output are the focus of many businesses. Certain energy management applications enable operators to adjust power consumption to realize energy savings. PoE can be deployed to provide and to manage inline power for endpoint devices. Applications and endpoints using PoE technology are increasing in market segments such as IP telephony, wireless local area network (WLAN), Smartgrid, etc. The growth in these market segments has resulted in an increase in the manufacture of PoE endpoint devices and/or powered devices (PD) [which can be used interchangeably herein]. Intelligent management of these devices becomes significant for optimizing their operations.

Typically, there can be a host in an energy management architecture. The host can be any type of network element such as a switch, a router, a gateway, etc., which has a PoE module provisioned for certain energy applications. Endpoints are generally connected to this host directly. During a power-up phase, the endpoints interact with the host to send a message that includes power consumption details. Those power consumption details (e.g., and its corresponding negotiation) can be carried over various protocols such as Cisco Discover Protocol (CDP), Link Layer Discovery Protocol (LLDP), IEEE 802.3af, etc. In regards to the limitations of such energy management systems, a challenge lies in the ability to decide when to power off/on endpoints. Moreover, power management applications fail to provide a uniform manner of determining the state of endpoints (e.g., before powering the device on or off). For example, there is no reactive mechanism to power on an IP phone, as an incoming call is being received. Additionally, there is no mechanism for the endpoint itself to indicate when it should be powered on or off.

Along similar lines, there may be scenarios where the endpoint (e.g., such as an IP phone) has an active call, but there is no traffic propagating through the IP phone (e.g. on a shared line, a WebEx conference call in which the end user is passively listening, a call is on hold, etc.). For these cases, the IP phone would be systematically powered off, even though there is an active call on the endpoint. In other instances, the end user can experience call interruption and, further, fail to identify the current state of the IP phone. Note also that in many systems, endpoints (e.g., IP phones) are turned on, or turned off based on a given policy. For example, all of the lights in the building may be turned off after 11 PM, where these commands are given based on policy settings. However, no mechanism is provided for network elements, for call agents, or for the endpoints themselves to dictate exact times when the power should be turned on or off. Additionally, no architecture accounts for the current status of a given endpoint before making power management decisions.

Other architectures may employ catalyst switches, which have intelligence for inferring when an IP phone call may be active (e.g., based on class of service (CoS) packets when a quality of service (QoS) is enabled). In other instances, a time range of when to power on a device is provided within some type of power management application. In using the QoS model configuration, there is an inherent limitation because the feature would only work if QoS were currently enabled. Additionally, such a configuration could not be extended to other platforms/switches due to hardware/software constraints.

In accordance with certain embodiments of the present disclosure, communication system 10 can address many of these issues by providing an optimal power management architecture. In certain examples, communication system 10 can be configured to offer a protocol that can be used between a host (e.g., a PoE switch) and an endpoint. Further, the features of communication system 10 can be readily extended to IP phones, Webcams, wireless access points (APs), or any other appropriate endpoint. As further detailed below, messages can be exchanged between PoE endpoints, PoE switches, and/or a call control agent (e.g., a device that can be associated with manager element 14). In one particular example, the call control agent can be provided in conjunction with manager element 14, which could be representative of a Cisco Unified Call Manager (CUCM) element, a Cisco Unified Call Manager Express (CUCME) element, or any other appropriate call management mechanism. Furthermore, these messages can be exchanged when a power control application attempts to power on and off the endpoint. In one particular example, the state of the endpoint can be exchanged using either CDP, LLDP, IEEE 802.3af, serial tunnel, or any other appropriate protocol, which may (or may not) include a Type Length Value (TLV) format.

In operation, when an endpoint initiates a boot-up phase, the power consumption details of the endpoint can be carried over a suitable protocol (e.g., CDP, LLDP, IEEE 802.3af, etc.). Applications can use this information to derive power configurations for these endpoints. Commonly, this data can be formatted using a TLV attribute within one of these protocols. In particular embodiments, communication system 10 includes a new TLV field to carry the power off/power on messages in CDP and LLDP. A similar TLV attribute could be used in IEEE 802.3af, or in any other appropriate protocol.

In one particular use case involving LLDP for powering off an endpoint, LLDP does not have a specific frame header of its own. LLDP typically follows a TLV format for carrying data. Apart from the field of chassis, port ID, time-to-live parameter, etc. the remainder of the TLV is optional. Such optional TLVs can be defined to carry state information for endpoint devices, as further detailed herein.

Figure 2:
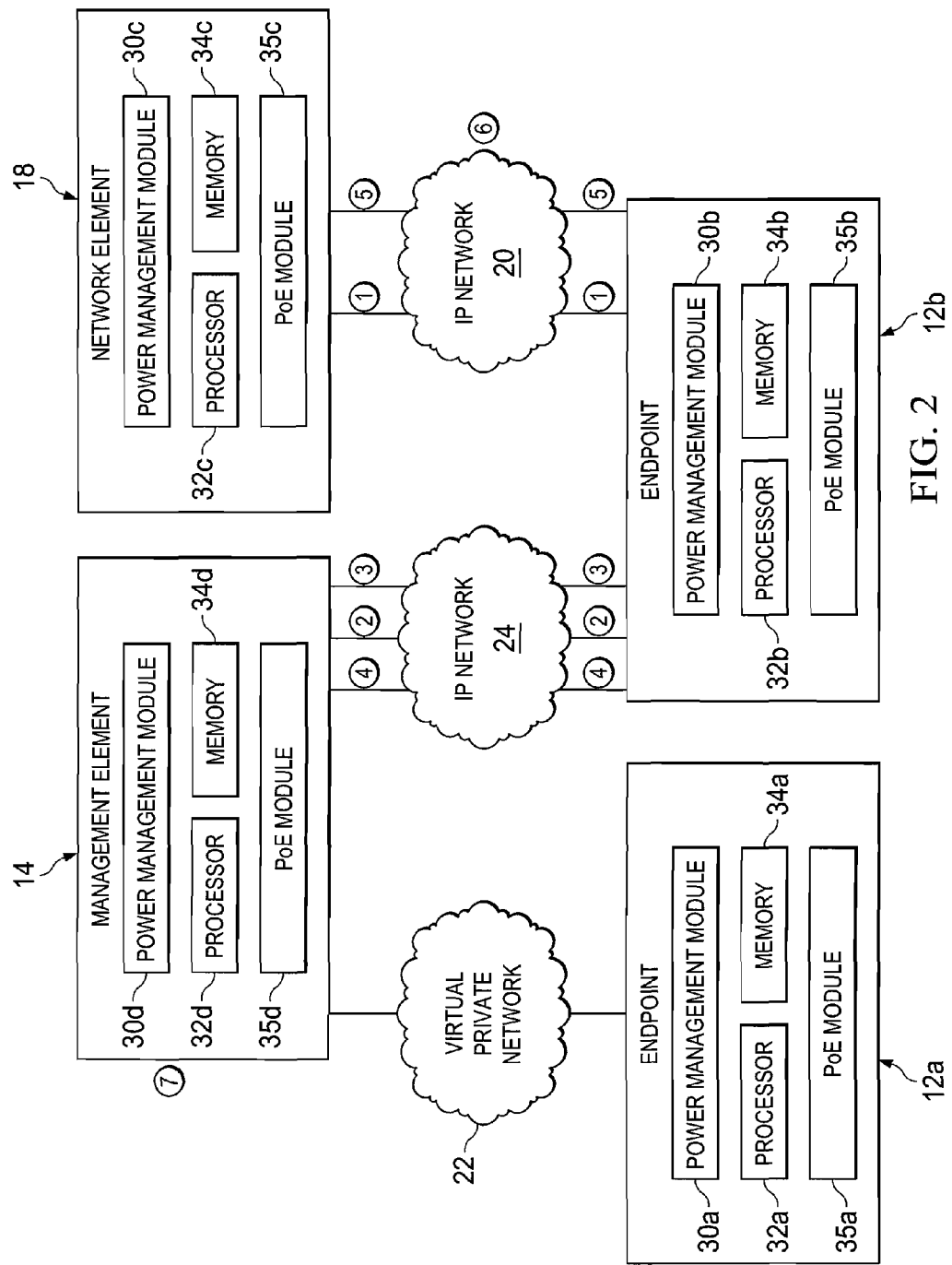
FIG. 2 is a simplified block diagram illustrating additional details related to an example infrastructure of the communication system in accordance with one embodiment.

Turning to FIG. 2, FIG. 2 is a simplified block diagram illustrating additional details related to an example infrastructure of communication system 10 in accordance with one embodiment. As illustrated in FIG. 2, each of manager element 14, endpoints 12*a-b*, and network element 18 each include a respective power management module 30*a-d*, a respective processor 32*a-d*, a respective memory element 34*a-d*, and a respective PoE module 35*a-d*. Note that management element 14 can be a functional element to control endpoints. Further, PoE module 35*d* can be optional because not all call agents are provisioned on routers having PoE modules. More specifically, management element 14 need not have a PoE module, where it would be more important that network element 18 includes a PoE module. In certain scenarios, it is possible that both management element 14 and network element 18 can be a single physical entity (e.g., certain call managing elements include both functionalities).

Each of these devices of FIG. 2 can also include suitable interfaces for receiving and/or transmitting data. PoE modules 35*a-d* can readily interact with each other in order to exchange energy data, commands, etc. In addition, PoE modules 35a-d can readily be provided within power management modules 30a-d (or vice versa). Any of these elements can be used in managing power for endpoints 12a-b. For example, these elements can be used to turn on, or to turn off a given endpoint 12a-b. Before turning to some of the example operations of this architecture, a brief discussion is provided about some of the infrastructure of FIGS. 1-2.

Endpoints 12a-b are representative of devices that can be powered on, powered off, put in various other states (sleep, hibernation, etc.), or otherwise managed using network communications. The term 'endpoint' is inclusive of devices used to initiate a communication, such as a computer, a personal digital assistant (PDA), a laptop or electronic notebook, a Webcam, a wireless access point, a residential gateway, a modem, a cellular telephone, an iPhone, an IP phone, a digital video recorder, a camera, or any other device, component, element, or object capable of initiating or facilitating voice, audio, video, media, or data exchanges within communication system 10. Endpoints 12a-b may also be inclusive of a suitable interface to the human user, such as a microphone, a display, or a keyboard or other terminal equipment. Endpoints 12a-b may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In one particular embodiment, endpoints 12a-b support Power over Ethernet (PoE) and, more particularly, draw power over Ethernet links.

Network element 18, manager element 14, and/or power management application element 16 are network elements that generally manage (or that cooperate with each other in order to manage) power controls in a network environment. As used herein in this Specification, the term 'network element' is meant to encompass routers, switches, gateways, bridges, loadbalancers, firewalls, applications, application program interfaces (APIs), EnergyWise infrastructure, Smartgrid devices, inline service nodes, proxies, servers, processors, modules, or any other suitable device, component, element, or object operable to exchange information in a network environment. This network element may include any suitable hardware, software, components, modules, interfaces, or objects that facilitate the operations thereof. Note also that the network element the network element can have a capability to generate power over Ethernet to the endpoints to which it is connected. This may be inclusive of appropriate algorithms and communication protocols that allow for the effective exchange (reception and/or transmission) of data or information.

IP networks 20, 23, 24, and 26 represent a series of points or nodes of interconnected communication paths for receiving and transmitting packets of information that propagate through communication system 10. IP networks 20, 23, 24, and 26 offer a communicative interface between network elements, devices, etc. and may be any local area network (LAN), wireless LAN (WLAN), metropolitan area network (MAN), wide area network (WAN), extranet, Intranet, VPN, or any other appropriate architecture or system that facilitates data propagation in a network environment. IP networks 20, 23, 24, and 26 can support a transmission control protocol (TCP)/IP, or a user datagram protocol (UDP)/IP in particular embodiments of the present disclosure; however, IP networks 20, 23, 24, and 26 may alternatively implement any other suitable communication protocol for transmitting and receiving data packets within communication system 10. IP networks 20, 23, 24, and 26 can foster various types of communications and, further, can be replaced by any suitable network components for facilitating the propagation of data between participants in a conferencing session. VPN 22 can offer a secure connection between a given endpoint and any other suitable network node. In one particular example, VPN 22 can offer an interface between a given endpoint and manager element 14, as is illustrated in FIG. 1. This may allow manager element 14 (or an associated call agent) to infer (or to otherwise become aware of) the status of a given endpoint (e.g., an IP phone on a call, an IP phone receiving an incoming call, an IP phone configured as an emergency line that should not be powered off, etc.).

Note that endpoints 12a-b, network element 18, manager element 14, and/or power management application element 16 may share (or coordinate) certain processing operations. Using a similar rationale, their respective memory elements may store, maintain, and/or update data in any number of possible manners. Additionally, because some of these network elements can be readily combined into a single unit, device, or server (or certain aspects of these elements can be provided within each other), some of the illustrated processors may be removed, or otherwise consolidated such that a single processor and/or a single memory location could be responsible for certain activities associated with power management controls. In a general sense, the arrangement depicted in FIG. 2 may be more logical in its representations, whereas a physical architecture may include various permutations/combinations/hybrids of these elements.

In one example implementation, endpoints 12a-b, network element 18, manager element 14, and/or power management application element 16 includes software (e.g., as part of power management modules 30a-d and/or PoE modules 35a-d, where these modules can be consolidated in any fashion) to achieve the power management operations, as outlined herein in this document. In other embodiments, this feature may be provided externally to any of the aforementioned elements, or included in some other network element (which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these power management operations.

In operation, a given network element (e.g., a switch, a router, a gateway, etc.) can use their respective PoE module 35a-d (or power management module 30a-d) to send, for example, a CDP or an LLDP packet to query the state of the targeted endpoint. This query is requesting whether it is possible to turn off the endpoint. In particular examples, the query can be triggered by a policy, which can be provided within power management application element 16. In one particular example, power management application element 16 is associated with Cisco EnergyWise infrastructure. [Other examples could be provided in conjunction with different power management applications.] The targeted endpoint can respond to the initial packets by identifying its state by using a similar signaling format (e.g., a CDP packet or an LLDP packet). The endpoint can readily obtain state information from resident applications (e.g., via an application program interface (API)), or such information may be retrieved from an external device (e.g., a call agent). For example, in response to receiving the initial querying packets, the endpoint device can interact with a call agent to identify if it can be powered off, before responding to the request.

Network element 18 can use the state of the endpoint to decide if (and when) to power off the endpoint (e.g., the IP phone). Further, the endpoint can have the intelligence to initiate a CDP packet or an LLDP packet being sent to a controller of network element 18. These packets could similarly offer commands for powering the endpoint on, off, or entering a sleep state, a hibernating state, etc. In particular provisioning arrangements, this packet propagation can be triggered based on a policy in the endpoint device, or provided within power management application element 16. Additionally, external applications (e.g., applications being executed on a call agent) can trigger power changes for the endpoint devices based on particular scenarios (e.g., powering on the endpoint device due to a recent event, an incoming call, etc.).

It should also be noted that the sequences detailed herein can apply to connections over VPN 22. For example, a given endpoint may be directly connected to a call agent that is associated with manager element 14. In such a case, a VPN connection can be leveraged in order to facilitate interactions between the endpoint and the call agent (which may be management element 14, or suitably interact therewith). Moreover, a call agent can power on a given endpoint (to which it is directly connected) in response to upcoming events. For example, the endpoint can be powered on when an incoming call is being received. These activities are further detailed below with reference to particular flow diagrams.

In terms of advantages, embodiments of communication system 10 can allow power management applications (e.g., resident in routers, gateways, switches, etc.) to execute efficient decisions about whether to power off certain endpoints. In addition, the actual decision to power off a given endpoint can be made after consulting the endpoint itself and/or external devices (such as call control agents). Moreover, endpoint devices can trigger an appropriate message at any time to inform a controller (e.g., within network element 18, within the endpoint itself, etc.) to turn off the power of the endpoint: instead of waiting for the controller to turn off the power based on certain policies. In this sense, the energy control is more precise, timely, and based on a possible real-time evaluations of the endpoint. It should also be noted that certain embodiments of communication system 10 can employ Cisco EnergyWise infrastructure (which may use CDP, and UDP for informational exchanges) that can be readily integrated with such protocols.

Turning to FIG. 3, FIG. 3 is a simplified schematic diagram illustrating details related to example signal formatting associated with communication system 10 in accordance with one embodiment. FIG. 3 includes an opcode format 40, which in this particular example includes 8 bits. Opcode format 40 is representative of an LLDP TLV format for carrying PoE endpoint device state information in this particular embodiment. Opcode format 40 includes a type segment, a length segment (4 bytes), an opcode segment (8 bit), and an information segment (24 bits). Also provided is a source indicator (bit 7 and bit 6), which can be used to identify a host, an endpoint, a call agent, etc. In addition, bits 3-5 are reserved for other possible applications, parameters, characteristics, etc. Bit-0, Bit-1, and Bit-2 are used for indicating state (e.g., to power on and power off selected endpoints).

FIG. 3 also includes a bit explanation table 42. In this particular instance, bits 0-2 are assigned particular meanings for controlling activities associated with energy management. For example, when the bits are set to all zeroes, the endpoint can be powered off. In addition, due to bit settings, endpoints can be powered on, or powered on with a particular time range, as is shown in table 42. Additionally, other bit settings may dictate certain communications between call agents and particular endpoints. Note that the 'length' and 'information messages' field in the TLV can be extended and, further, modified based on particular requirements. Table 42 (and copies or portions thereof) may be stored in any of the elements of FIG. 2.

Figure 4:
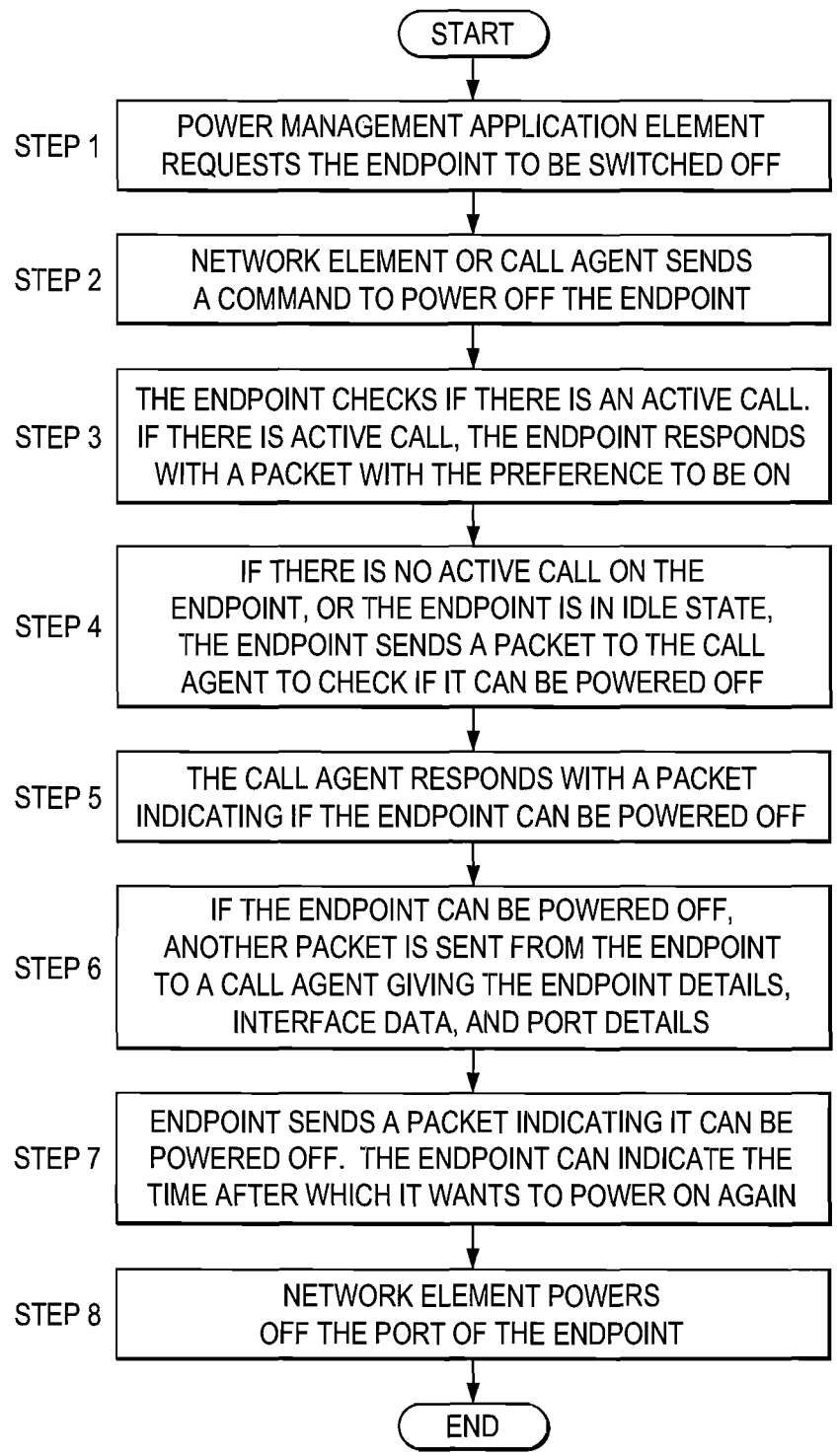
FIG. 4 is a simplified flowchart illustrating details related to certain components of the communication system in accordance with one embodiment.
Figure 5:
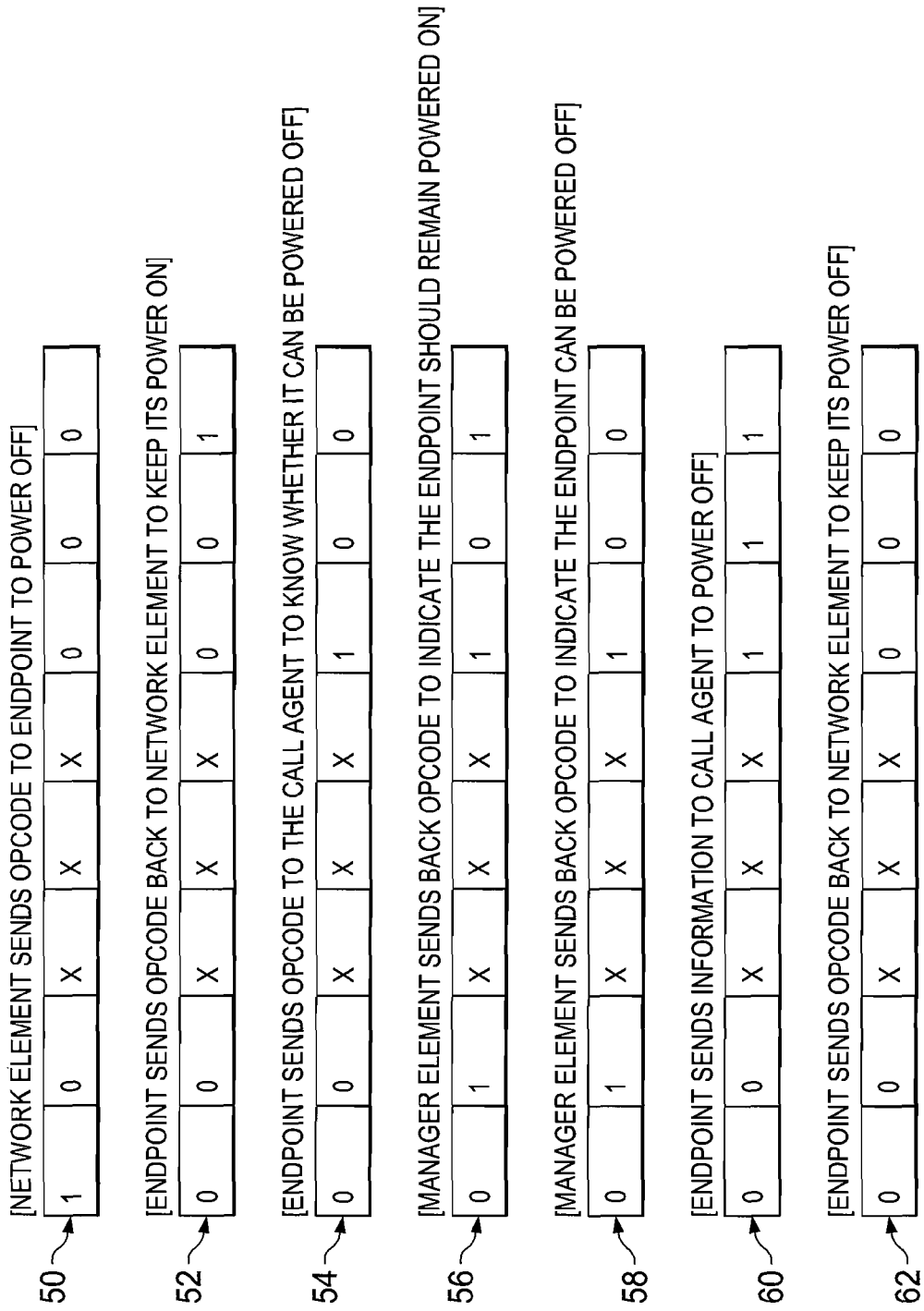
FIG. 5 is a simplified schematic diagram illustrating details related to signal formatting associated with the communication system in accordance with one embodiment.

FIG. 4 is a simplified flowchart illustrating details related to certain components of communication system 10 in accordance with one embodiment. FIG. 5 is a simplified schematic diagram illustrating details related to example signal formatting. Note that because FIGS. 4-5 are related, they are discussed together in explaining the possible formatting and steps associated with powering off a given endpoint. At step 1 of FIG. 4, a power management application or policy (e.g., resident in power management application element 16) can request endpoint 12a (e.g., a PoE device) to be switched off. The request can be sent to an endpoint connected (either directly or indirectly) to a call agent (which may be part of manager element 14, or coupled thereto), or to an endpoint connected to network element 18 (e.g., a PoE switch).

Subsequently, at step 2, the PoE switch or call agent can communicate a command to power off the PoE endpoint. The LLDP/CDP packet for this indication is defined by element 50 of FIG. 5. In this particular example, a PoE controller (e.g., included within network element 18) communicates the illustrated opcode to an IP phone for powering off. At step 3 of FIG. 4, an endpoint is configured to check if there is an active call on the IP phone. If there is an active call present, the endpoint responds with an LLDP/CDP packet that indicates there is a preference for the endpoint to be powered on. Element 52 of FIG. 5 illustrates an example opcode to achieve this objective.

Step 4 of FIG. 4 illustrates that if there is no active call on the IP phone, or if the IP phone is in an IDLE state, the IP phone can communicate a CDP/LLDP packet to a call agent to evaluate whether it can be powered off. This activity is performed because there could be cases where the IP phone should not be powered off (e.g., if the IP phone is part of an Emergency Group such as 911, or if the user associated with the IP phone has requested a certain configuration). FIG. 4 includes an element 54 that illustrates an example opcode, which the endpoint can send to the call agent to evaluate whether the endpoint can be powered off.

Step 5 of FIG. 4 illustrates how a given call agent could respond to the previous message by communicating an LLDP/CDP packet. This particular packet can indicate whether the endpoint can be powered off. FIG. 5 includes an element 56 that illustrates an example opcode for identifying that the power for this particular endpoint should remain on. In addition, FIG. 5 includes an element 58 that illustrates an opcode to indicate the endpoint can be powered off.

Step 6 of FIG. 4 illustrates that if the endpoint can be powered off, another LLDP/CDP packet can be sent from endpoint to the call agent. This particular packet can offer endpoint details, switch interface data, port details for the port to which an endpoint may be connected, etc. The call agent could use this information to intelligently control power for the endpoint. FIG. 5 includes an element 60 that reflects an example opcode, which reflects how the endpoint would send information to the call agent in order to achieve a power off.

Note that particular informational messages (e.g., between an endpoint in any other network element) can contain information about CDP/LLDP device capability, IP address information, switch interface information, port information, MAC address information for the switch (and its interface MAC address), etc. A length field can be modified based on the content of such informational messages.

Step 7 of FIG. 4 illustrates how an LLDP/CDP packet can be sent (indicating that it can be powered off). Further, the endpoint can indicate the time after which it seeks to be powered on again. FIG. 5 includes an element 62 that offers an example opcode for allowing the endpoint to communicate back to a given network element that the endpoint should have its power kept off. Step 8 of FIG. 4 illustrates network element 18 powering off the port of the endpoint. For example, a given switch or a given PoE controller can power off the port of an IP phone.

Figure 6:
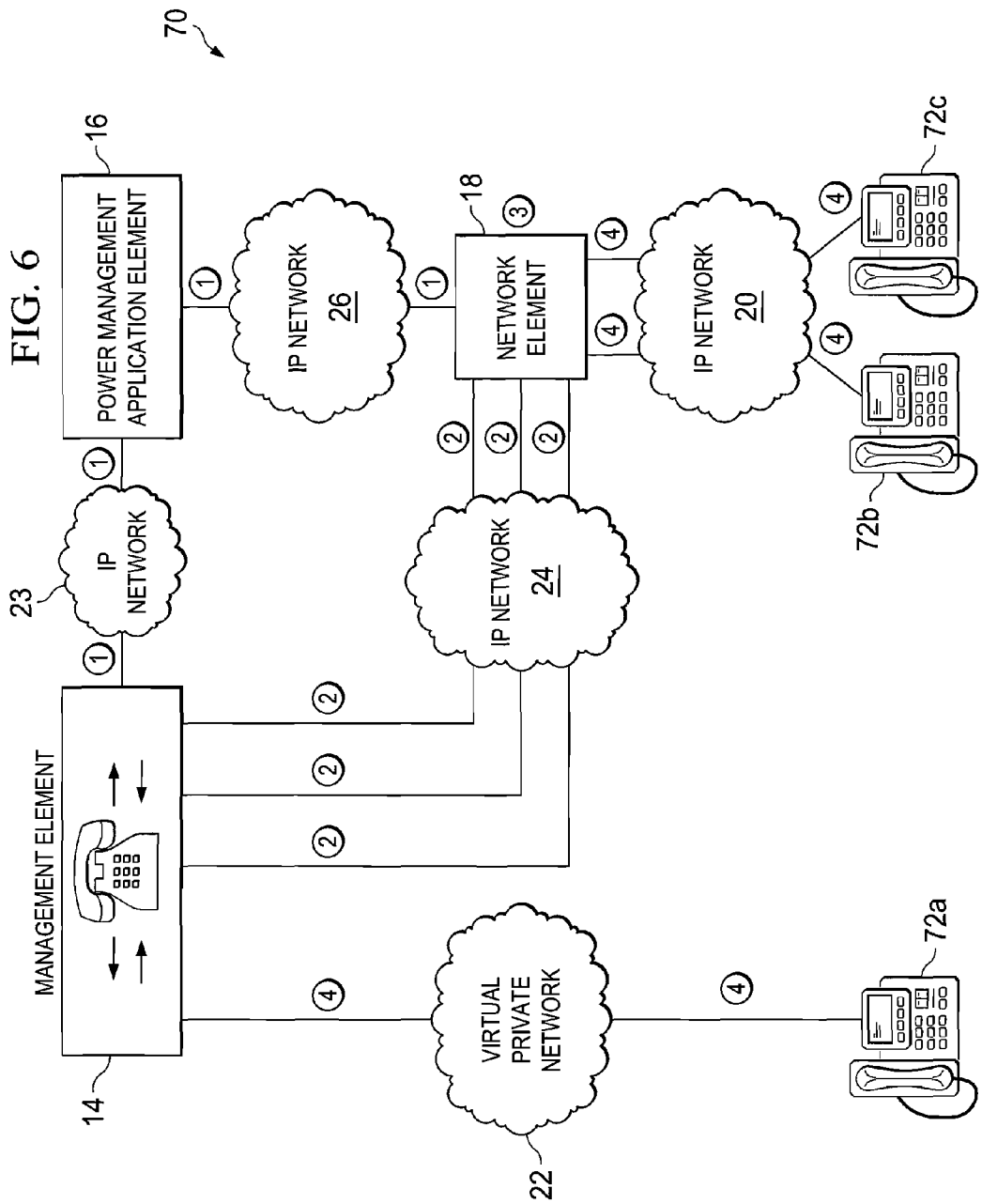
FIG. 6 is a simplified block diagram illustrating details related to another communication system in accordance with one embodiment.

FIG. 6 is a simplified block diagram illustrating details related to another communication system 70 in accordance with one embodiment. In one particular example, FIG. 6 can be used to represent an intelligent powering on of a PoE endpoint, which could be any one of a set of IP phones 72a-c illustrated in FIG. 6. The particular PoE endpoint could be powered on using any one of the following protocols. First, a power control application can power on the PoE ports based on a configured time provided in a given policy. Second, a PoE endpoint (e.g., when previously powered off) could have indicated when it seeks to power on through a timer value. At timer expiration, the PoE controller (e.g., resident in network element 18) can switch on the PoE port that is on the device to which the PoE controller is currently connected. Third, the call control agent (e.g., associated with manager element 14) can power on an IP phone connected to a PoE port for an incoming call for the particular IP phone. This may not be necessarily applicable where alternative mechanisms (e.g., call forward) are configured for the endpoint. Note that the flow numbers illustrated in FIG. 6 are detailed below with reference to FIG. 7.

Figure 7:
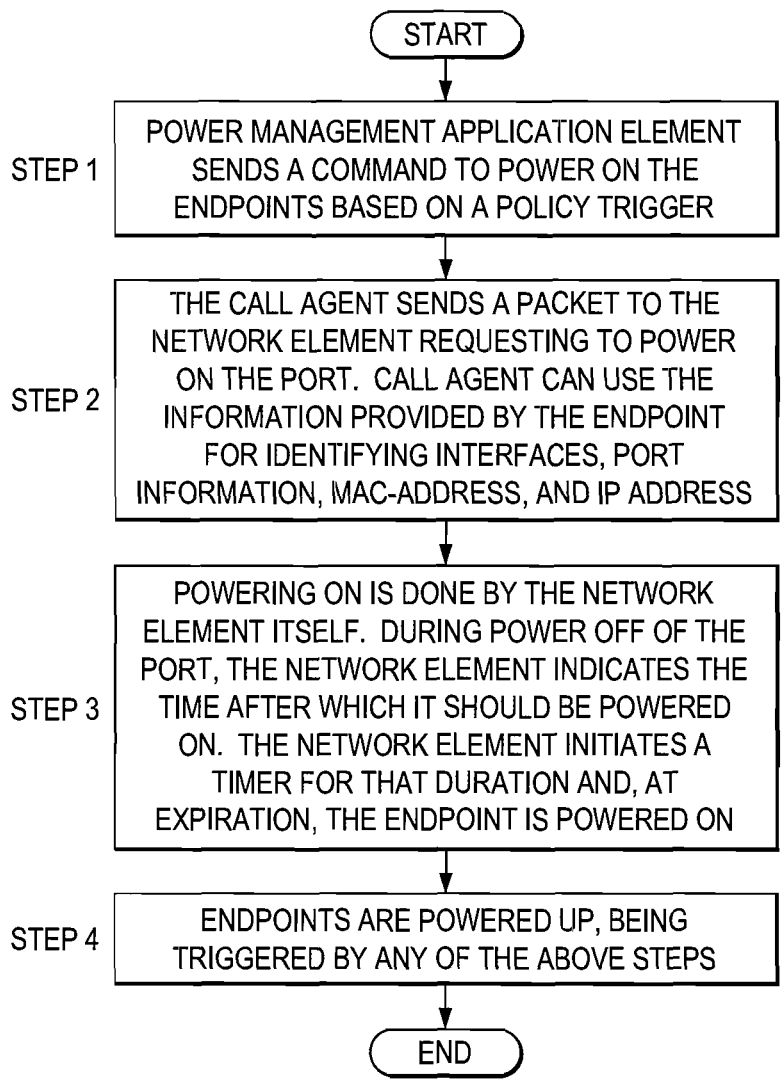
FIG. 7 is a simplified flowchart illustrating details related to certain components of the communication system in accordance with one embodiment.
Figure 8:
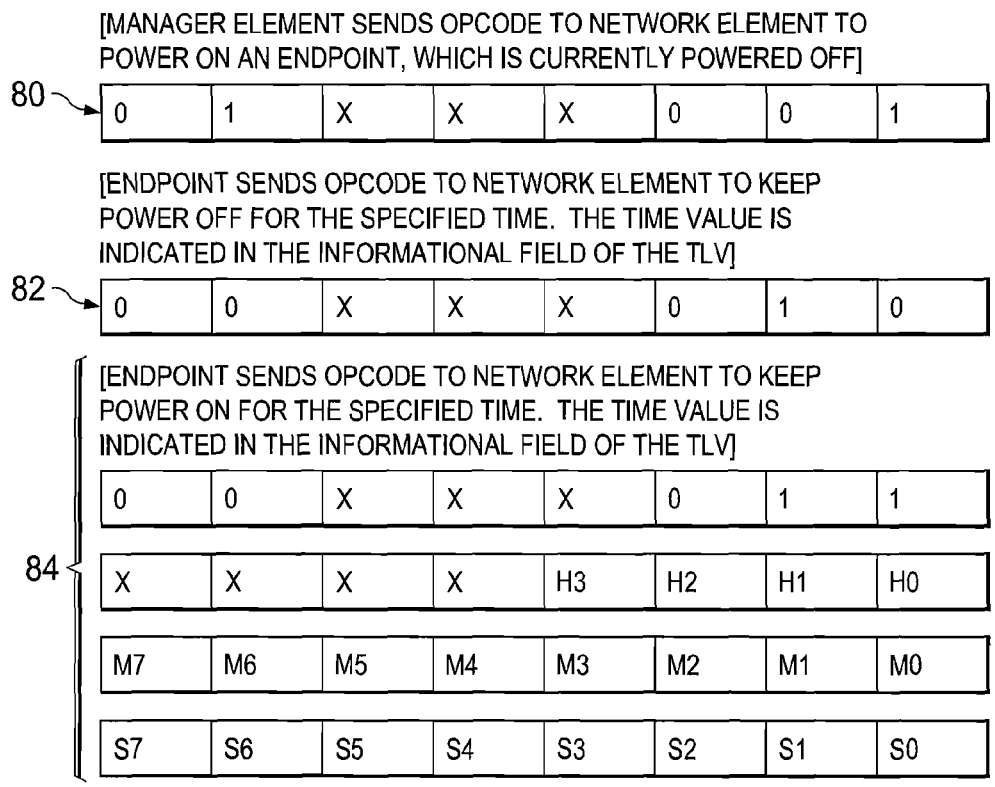
FIG. 8 is a simplified schematic diagram illustrating details related to signal formatting associated with the communication system in accordance with one embodiment.

FIG. 7 is a simplified flowchart illustrating details related to the example configuration of FIG. 6. In addition, FIG. 8 is a simplified schematic diagram illustrating details related to signal formatting associated with this particular example. For this reason, FIG. 7 and FIG. 8 are discussed together. At step 1 of FIG. 7, a power management application element sends a command to power on endpoints based on a policy trigger. For example, an EnergyWise controller application can issue a command to power on endpoints based on a predefined policy setting. In this particular instance, an opcode may not be required. This is because the endpoint is not in a state for which messages can be received. Note also that an IP phone that supports a hibernating mode can use a defined opcode.

Step 2 of FIG. 7 illustrates a call agent sending a packet to network element 18 requesting to power on the port of an endpoint. This is representative of a different way of powering on an endpoint from a call agent, when an endpoint receives an incoming call for the endpoint. In this particular case, the call agent sends an LLDP/CDP packet to a PoE controller requesting the controller to power on the PoE port. The call agent can use the information provided by the IP phone (e.g., switch device capability information inclusive of switch interface data, port information, MAC address, IP address, etc.). FIG. 8 includes an element 80 that reflects an example opcode for communicating such a signal to indicate to power on an endpoint. For example, such an opcode could be used by a manager element to direct a switch/router/PoE controller to power on an IP phone that is currently powered off.

Step 3 of FIG. 7 illustrates a powering on operation being performed by a network element itself. For example, a PoE controller itself can control powering on and off the endpoint. This could apply to cases in which, during power off for the PoE port, the connected endpoint can indicate the time at which it should be powered on. A given PoE switch can start a timer for a particular duration and, upon timer expiration, network element 18 can power on the endpoint. FIG. 8 illustrates an element 82 that represents an example opcode for designating time periods in which the power for an endpoint should be turned off. For example, the employee can send this particular opcode to a network element to keep its power off for a specified time. The time value can be indicated in the informational field of the TLV.

FIG. 8 also illustrates an element 84 for designating this time parameter. For example, an IP phone can send this particular opcode to a PoE controller to keep its power on for the specified time. The time value can be provided in the informational field of the TLV in particular examples of the present disclosure. Element 84 includes various fields such as S0-S7 (seconds information), M0-M7 (minutes information), and H0-H3 (hour information). Step 4 of FIG. 7 illustrates how endpoints would be powered up, where the requisite trigger can include any of the previously outlined steps.

Figure 9:
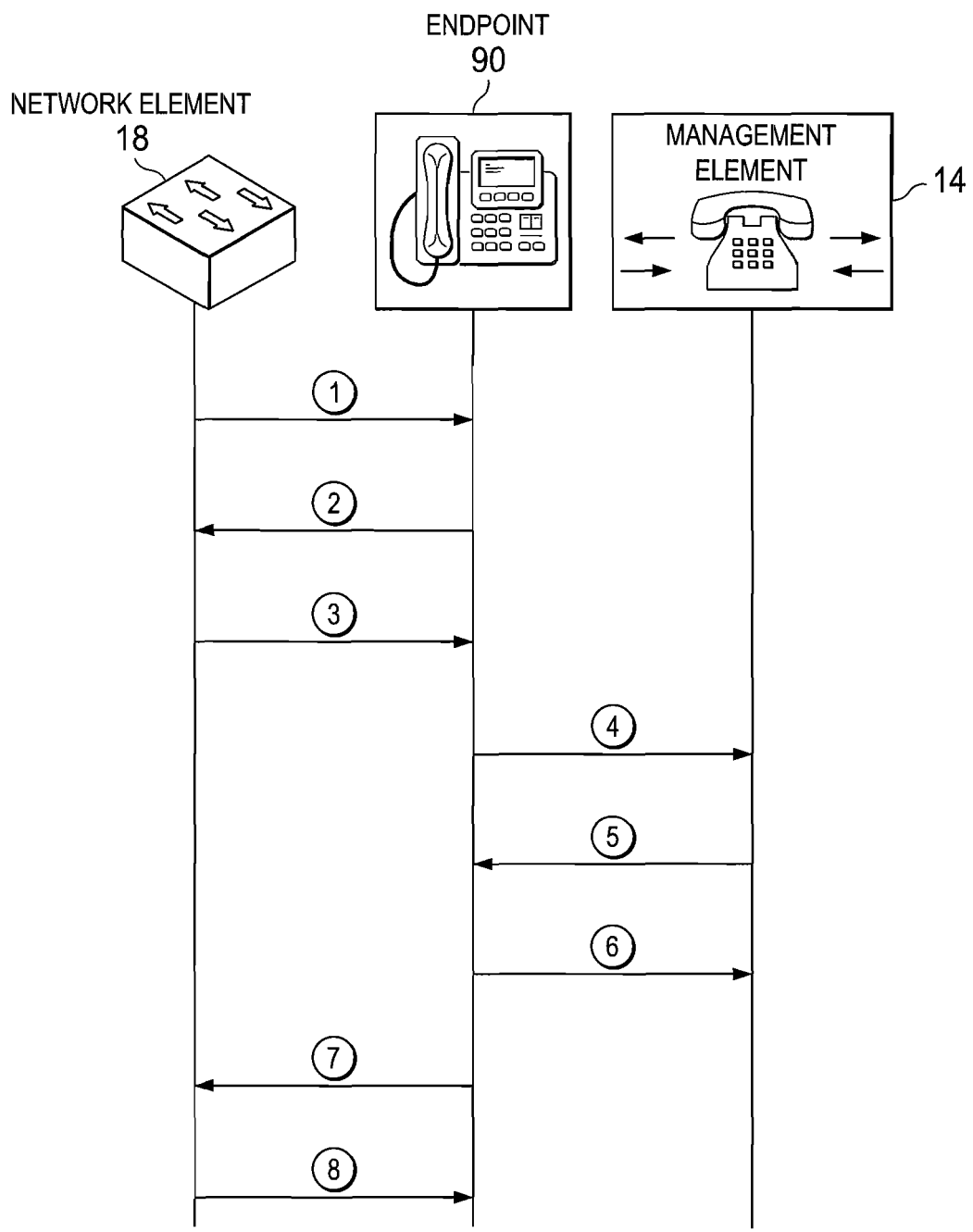
FIG. 9 is a simplified flow diagram illustrating details related to certain activities of the communication system in accordance with one embodiment.
Figure 10:
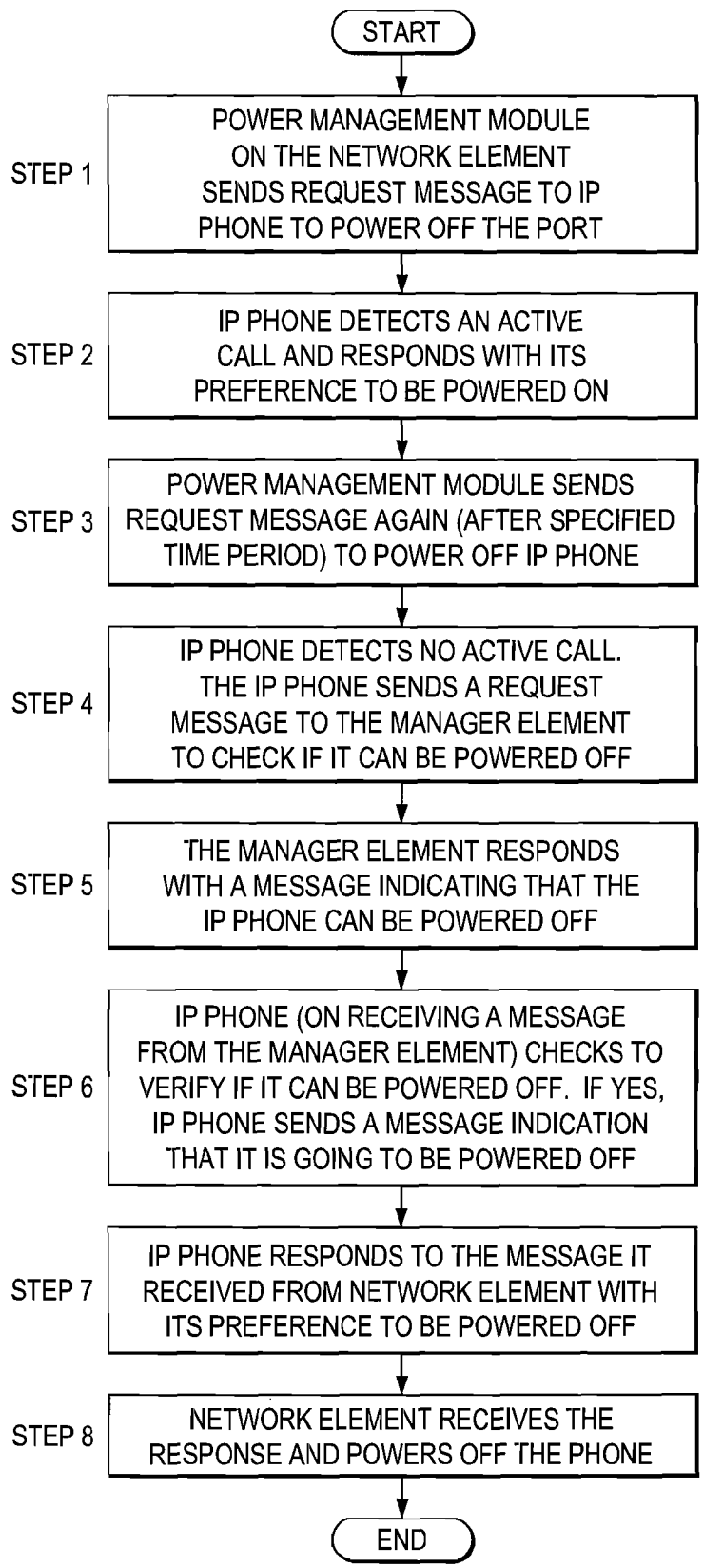
FIG. 10 is a simplified flowchart illustrating details related to the flow diagram of FIG. 9.

FIG. 9 is a simplified flow diagram illustrating details related to certain activities of communication system 10 in accordance with one embodiment. FIG. 9 includes network element 18 interacting with an endpoint 90, which is an IP phone in this particular example. Also provided in FIG. 9 is manager element 14, which is configured to interact with network element 18 and endpoint 90. FIG. 10 is a simplified flowchart illustrating details related to the flow diagram of FIG. 9. In one particular example, the use case being depicted by FIGS. 9-10 is related to powering off an endpoint from a host, or an application.

Note that a given power management application can execute decisions for powering on, and powering off PoE endpoint devices. In the scenario of FIGS. 9-10, the power management application can send LLDP messages to endpoint devices to identify the state of the endpoints. Furthermore, the power management application can turn off specific ports of connected endpoints. The particular scenarios of FIGS. 9-10 are explained with reference to the endpoint being an IP phone. In operation, an application can run externally (or internally) on a given network element (e.g., a switch). Such a network element is configured to send LLDP messages to an IP phone before shutting down a corresponding port connected to the IP phone. The IP phone can respond to the switch with its active call state and, further, provide information to power on (or to power off) the IP phone. In a generic sense, the switch can add intelligence to the power management application by evaluating a call status and/or IP phone preference for executing power management decisions.

FIG. 10 begins at step one, where the power management module on network element 18 sends a request message to the IP phone to power off its port. At step two, the IP phone detects an active call and, further, responds back with its preference to be powered on. A response message may have details associated with a designated time-to-wait interval (which can be based on particular needs and implementations). At step three, the power management module can send a request message again (after a specified time) to power off the IP phone. At step four, the IP phone detects that there is no active call. The IP phone can then send a request message to check if it can be powered off. At step five, manager element 14 can respond back with a message (e.g., an LLDP/CDP packet) to manager element 14 (e.g., or to an associated call agent) to verify whether the endpoint can be powered off.

At step six, the IP phone (upon receiving the message from manager element 14) verifies whether it can be powered off. If it can be powered off, the IP phone sends a message indicating that it is going to be powered off. At step seven, the IP phone responds to the message it received from network element 18 with its preference to be powered off. At step eight, network element 18 receives a response and powers off the phone. For example, step eight may involve either the PoE switch, or the power management application element receiving the response, evaluating response, and powering off the IP phone.

Figure 11:
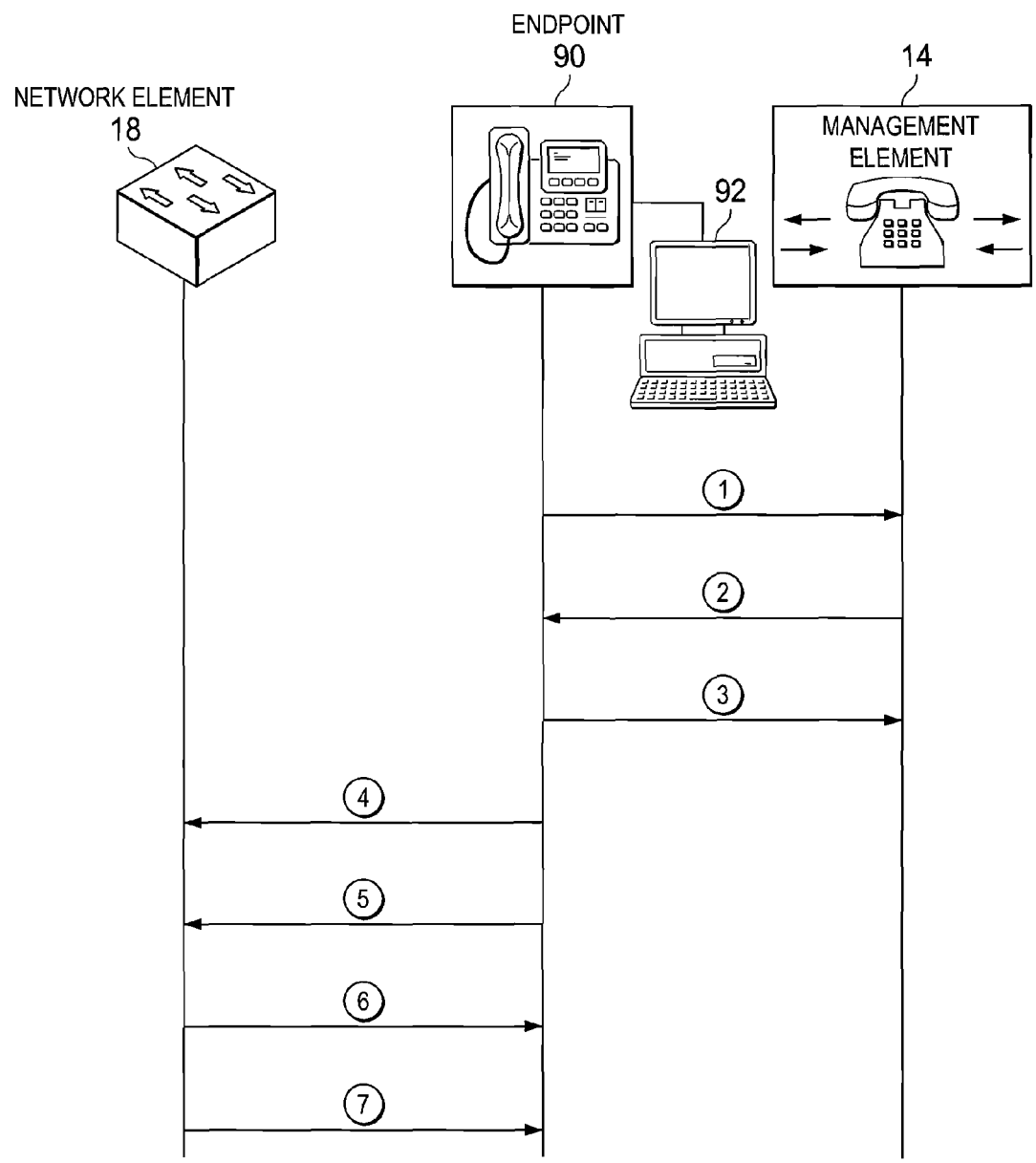
FIG. 11 is a simplified flow diagram illustrating details related to certain activities of the communication system in accordance with one embodiment.
Figure 12:
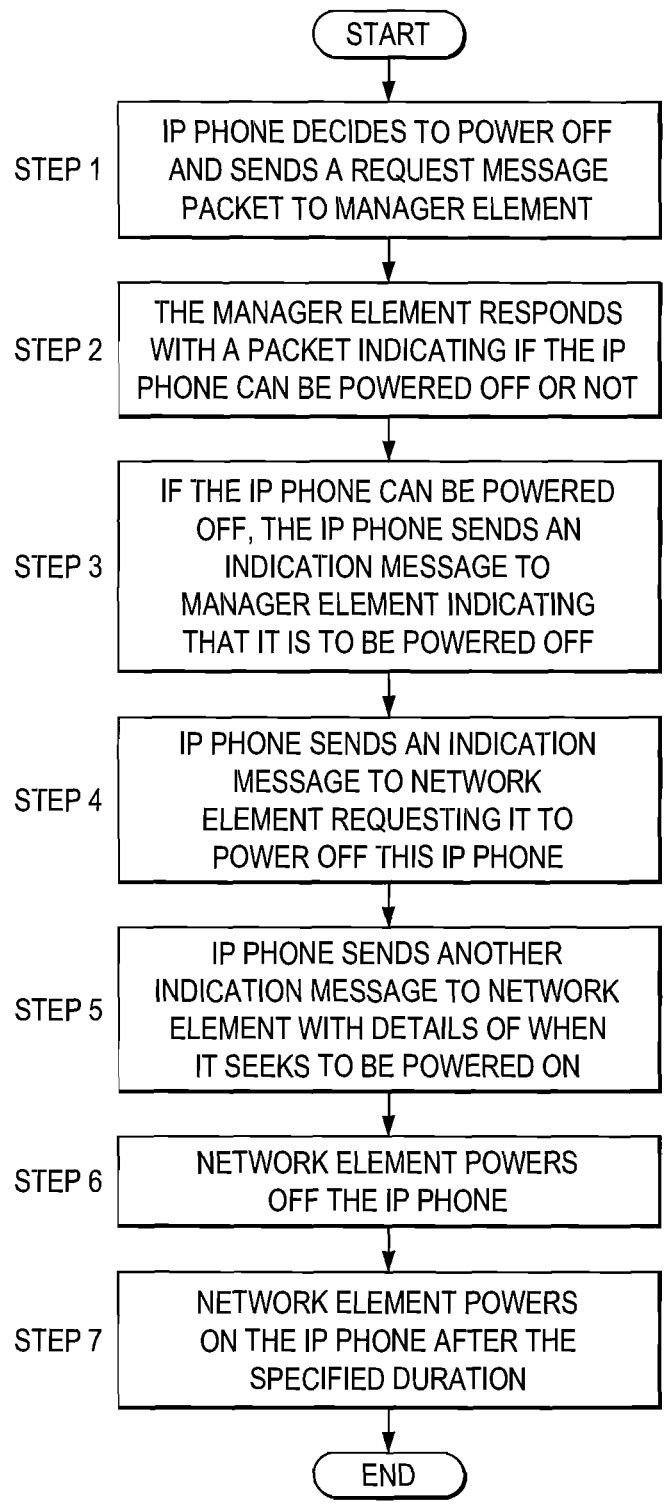
FIG. 12 is a simplified flowchart illustrating details related to the flow diagram of FIG. 11.

FIG. 11 is a simplified flow diagram illustrating details related to certain activities of communication system 10 in accordance with one embodiment. FIG. 11 includes network element 18, an endpoint 90 (which is an IP phone in this particular example), a computer 92, and manager element 14. FIG. 12 is a simplified flowchart illustrating details related to the flow diagram of FIG. 11. The particular scenario of FIGS. 11-12 relates to a use case for a self-initiated power on and off for an endpoint. In one example, a given PoE endpoint has the intelligence to power on, or to power off by itself, or by using an external source of its own domain (e.g., devices in its local domain). PoE endpoints can initiate a communication to an application to power on or off at a specified time. This scenario could involve a router, switch, an IP phone, a centralized call control agent, a presence server, etc. Thus, a given endpoint could decide to power off after consulting with a registered agent of manager element 14 (e.g., a call agent), or a presence server, etc.

Turning to FIG. 12, at step one, the IP phone decides to power off. The IP phone can send a request message (LLDP/CDP) packet to manager element 14. At step two, manager element 14 responds with a packet indicating whether the IP phone can be powered off. If the IP phone can be powered off, the IP phone sends an indication message to manager element 14 indicating that the endpoint is to be powered off. This is reflected by step three of FIG. 12. This communication can include details relating to switch information and/or the port to which the endpoint is connected.

Step four of FIG. 12 illustrates the IP phones sending an indication message to network element 18 (e.g., PoE controller) indicating to power off this endpoint. At step five, the IP phone also sends another indication message (e.g., an LLDP/CDP packet) to network element 18 (e.g., the PoE controller, the power management application, etc.) with the details of the timeframe at which the endpoint seeks to be powered on. At step six, network element 18 powers off the endpoint (e.g., IP phone). At step seven, network element 18 powers on the IP phone after the specified time duration.

Figure 13:
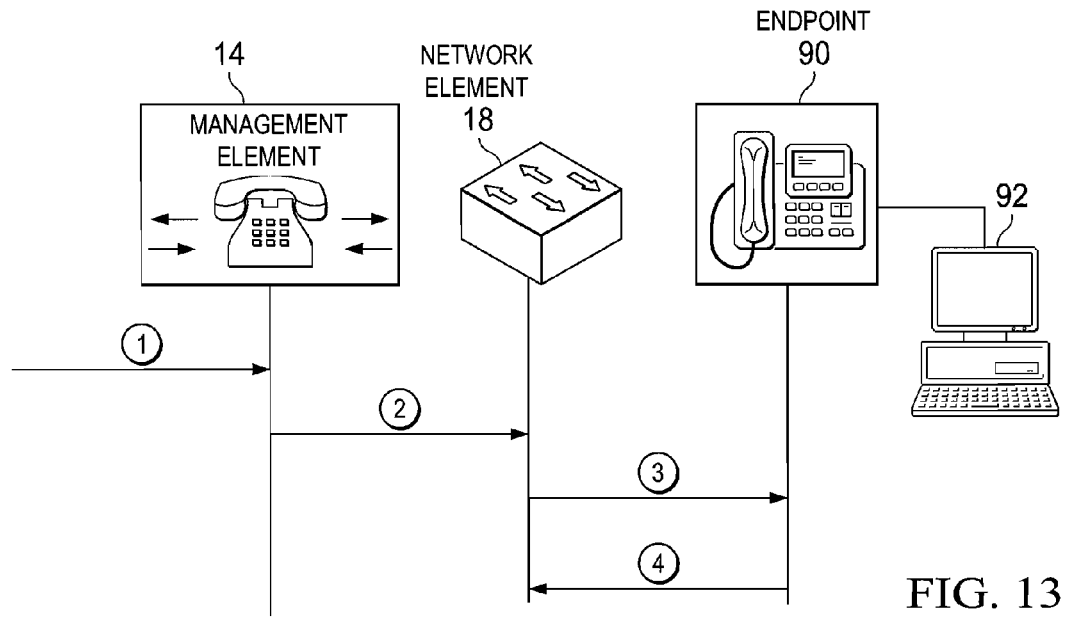
FIG. 13 is a simplified flow diagram illustrating details related to certain activities of the communication system in accordance with one embodiment.
Figure 14:
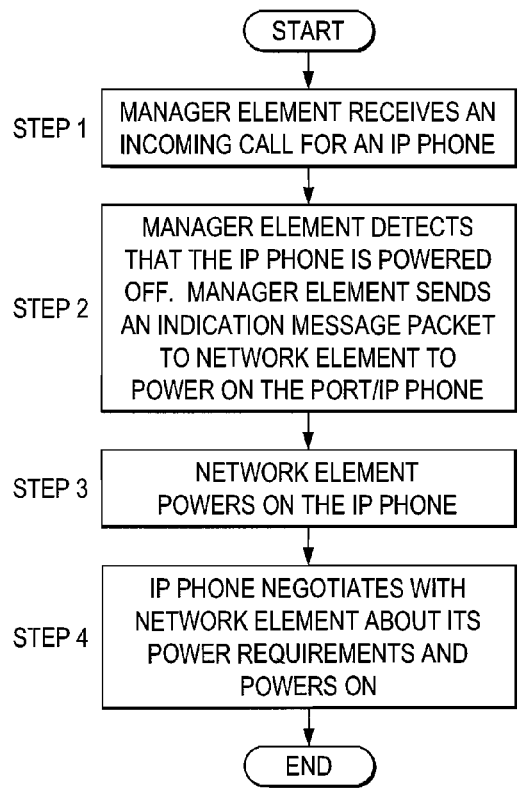
FIG. 14 is a simplified flowchart illustrating details related to the flow diagram of FIG. 13.

FIG. 13 is a simplified flow diagram illustrating details related to certain activities of communication system 10 in accordance with one embodiment. In addition, FIG. 14 is a simplified flowchart illustrating details related to the flow diagram of FIG. 13. The use case being represented by FIGS. 13-14 relate to powering on endpoints via a manager element. For example, PoE endpoint devices can be powered on through a call agent.

Turning to FIG. 14, manager element 14 can receive an incoming call for an endpoint at step one. For example, a call agent receives an incoming call for an IP phone. At step two, manager element 14 can detect that the IP phone is powered off. Operationally, this could include the call agent detecting that the IP phone is powered off though any suitable mechanism. This could involve the call agent sending an indication message packet (e.g., an LLDP/CDP packet) to the PoE switch to power on the port of the IP phone. Network element 18 can power on the IP phone at step three. At step four, the IP phone can negotiate with network element 18 about its power requirements. For example, the IP phone can negotiate with the PoE switch about its power requirements and subsequently power on.

Note that in certain example implementations, the power management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, power management modules 30*a*-*d* include software in order to achieve the power management functions outlined herein. These activities can be facilitated by endpoints 12*a*-*b*, network element 18, manager element 14, and/or power management application element 16. Endpoints 12*a*-*b*, network element 18, manager element 14, and/or power management application element 16 can include memory elements for storing information to be used in achieving the intelligent power management, as outlined herein. Additionally, endpoints 12*a*-*b*, network element 18, manager element 14, and/or power management application element 16 may include a processor that can execute software or an algorithm to perform the power management activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of rooms and sites, as well as more complicated/sophisticated arrangements and configurations. Accordingly, the examples provided herein should not limit the scope or inhibit the broad teachings of communication system 10 as potentially applied to a myriad of other architectures.

It is also important to note that the steps discussed with reference to FIGS. 1-14 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in Ethernet environments or arrangements, the present disclosure may be used in any energy environment that could benefit from such technology. Virtually any configuration that seeks to intelligently control power settings could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   communicating a first packet to a network element, from a call agent, in order to indicate whether an endpoint can have its power managed by network communications, wherein the first packet includes an Internet protocol (IP) address associated with the endpoint;
   receiving, at the call agent, a second packet from the network element to identify whether the endpoint can have its power managed, wherein the endpoint is configured to have its power managed via a Power over Ethernet port associated with the endpoint, and wherein a current state of the endpoint is communicated using a Type Length Value (TLV) format;
   communicating a request from the network element to power off the endpoint, wherein the end point determines whether it can be power off based, at least partially, on the current state of the endpoint; and
   receiving, from the endpoint, a power off request at the call agent when the end point determines it can be powered off, wherein the call agent can override the power off request.

2. The method of claim 1, wherein the endpoint is powered on, or powered off at a specific time based on a policy associated with the endpoint.

3. The method of claim 1, wherein the first packet includes the TLV format, wherein a command from the call agent is provided to power on the endpoint based on a presence of an incoming call for the endpoint.

4. The method of claim 1, wherein the first packet includes an opcode for identifying the current state associated with the endpoint.

5. The method of claim 1, wherein the endpoint is an Internet protocol (IP) phone, and wherein the first packet includes interface data and port details associated with the IP phone.

6. The method of claim 1, wherein the endpoint is configured to signal when it should be subsequently powered on, as the endpoint is being powered off.

7. The method of claim 1, wherein the endpoint obtains state information using an application program interface.

8. The method of claim 1, wherein the current state is a current power state of the endpoint.

9. The method of claim 1, wherein the call agent is separate from the network element.

10. The method of claim 1, wherein the call agent, the network element, and the endpoint are physically separate from each other.

11. Logic encoded in one or more non-transitory tangible media that includes code for execution and when executed by a processor operable to perform operations comprising:
    communicating a first packet to a network element, from a call agent, in order to indicate whether an endpoint can have its power managed by network communications, wherein the first packet includes an Internet protocol (IP) address associated with the endpoint;
    receiving, at the call agent, a second packet from the network element to identify whether the endpoint can have its power managed, wherein the endpoint is configured to have its power managed via a Power over Ethernet port associated with the endpoint, and wherein a current state of the endpoint is communicated using a Type Length Value (TLV) format;
    communicating a request from the network element to power off the endpoint, wherein the end point determines whether it can be power off based, at least partially, on the current state of the endpoint; and
    receiving, from the endpoint, a power off request at the call agent when the end point determines it can be powered off, wherein the call agent can override the power off request.

12. The logic of claim 11, wherein the first packet includes the TLV format, wherein a command from the call agent is provided to power on the endpoint based on a presence of an incoming call for the endpoint.

13. The logic of claim 11, wherein the first packet includes an opcode for identifying the current state associated with the endpoint.

14. The logic of claim 11, wherein the endpoint is an Internet protocol (IP) phone, and wherein the first packet includes interface data and port details associated with the IP phone.

15. The logic of claim 11, wherein the endpoint is configured to signal when it should be subsequently powered on, as the endpoint is being powered off.

16. An apparatus, comprising:
    a memory element configured to store electronic code,
    a processor operable to execute instructions associated with the electronic code, and
    a power management module configured to interface with the memory element and the processor such that the apparatus can:
       communicate a first packet to a network element, from a call agent, in order to indicate whether an endpoint can have its power managed by network communications, wherein the first packet includes an Internet protocol (IP) address associated with the endpoint;
       receive, at the call agent, a second packet from the network element to identify whether the endpoint can have its power managed, wherein the endpoint is configured to have its power managed via a Power over Ethernet port associated with the endpoint, and wherein a current state of the endpoint is communicated using a Type Length Value (TLV) format;

communicate a request from the network element to power off the endpoint, wherein the end point determines whether it can be power off based, at least partially, on the current state of the endpoint; and receive, from the endpoint, a power off request at the call agent when the end point determines it can be powered off, wherein the call agent can override the power off request.

17. The apparatus of claim 16, wherein the endpoint is powered on, or powered off at a specific time based on a policy associated with the endpoint.

18. The apparatus of claim 16, wherein the call agent is configured to communicate a command to power on the endpoint based on a presence of an incoming call for the endpoint.

19. The apparatus of claim 16, wherein the first packet includes an opcode for identifying the current state associated with the endpoint, and wherein the first packet includes the TLV format, wherein a command from a call agent is provided.

20. The apparatus of claim 16, wherein the endpoint is configured to signal when it should be subsequently powered on, as the endpoint is being powered off.

* * * * *